C. B. BUCK.
STEAM HOIST AND DUMP FOR AUTOTRUCKS.
APPLICATION FILED JUNE 11, 1915.

1,172,255.

Patented Feb. 22, 1916.

Witness
Fenton S. Belt

Inventor
Charles B. Buck
A. L. Hough
Attorney

UNITED STATES PATENT OFFICE.

CHARLES B. BUCK, OF WASHINGTON, DISTRICT OF COLUMBIA.

STEAM HOIST AND DUMP FOR AUTOTRUCKS.

1,172,255.           Specification of Letters Patent.        Patented Feb. 22, 1916.

Application filed June 11, 1915.    Serial No. 33,533.

*To all whom it may concern:*

Be it known that I, CHARLES B. BUCK, a citizen of the United States, residing at Washington, District of Columbia, have invented certain new and useful Improvements in Steam Hoists and Dumps for Autotrucks, of which the following is a specification, reference being had therein to the accompanying drawing.

This invention relates to new and useful improvements in steam hoists for dumping wagons and consists of a simple and efficient device of this nature having various details of construction, combinations and arrangements of parts which will be hereinafter fully described, shown in the accompanying drawings and then specifically defined in the appended claims.

Figure 1:
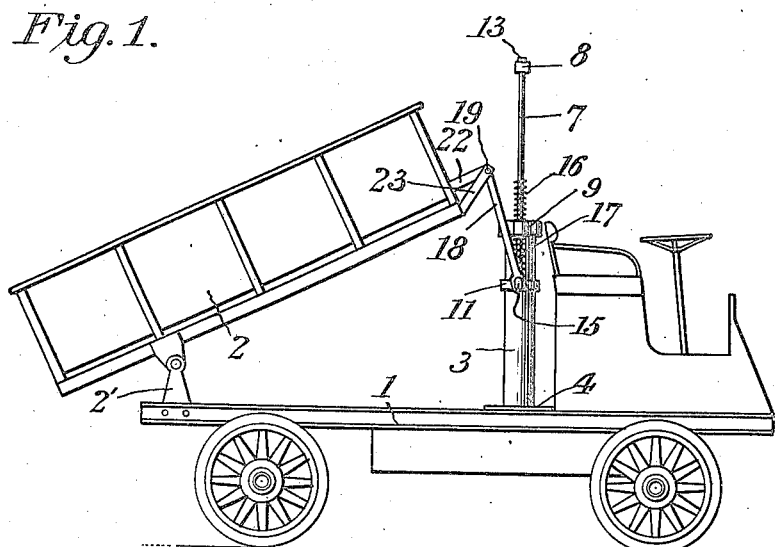
Figure 2:
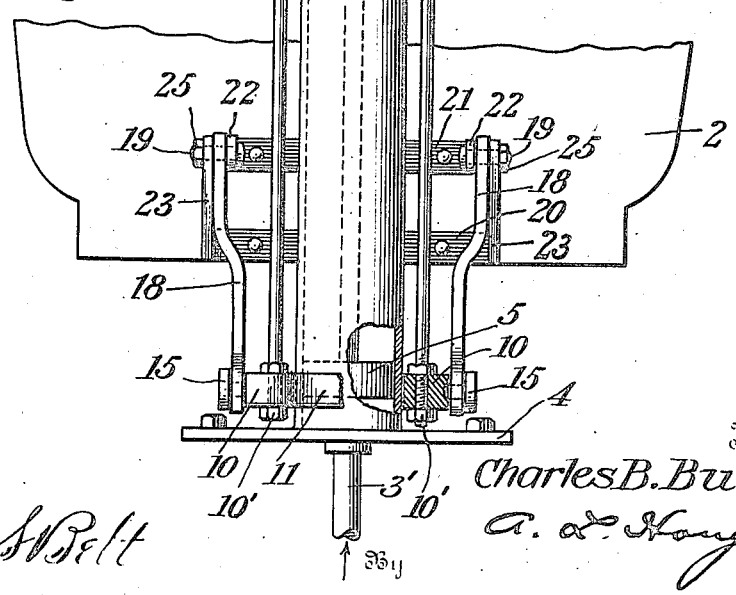

My invention is illustrated in the accompanying drawings, in which:

Figure 1 is a side elevation showing the application of my invention to a truck and box of a dump wagon, and Fig. 2 is an enlarged detail in elevation of the steam-actuated apparatus.

Reference now being had to the details of the drawings by numeral, 1 designates a truck mounted on suitable wheels and having a wagon box 2 pivotally mounted upon the standards 2'. A steam cylinder 3 is provided with a base 4 and is mounted upon the truck and has a pipe 3' leading into the bottom thereof whereby steam may be introduced into the lower portion of the cylinder. A piston 5 is mounted within the cylinder and has a stem 6 fixed thereto which works through a suitably packed gland at the upper end of the cylinder. A cross bar 8 is apertured for the reception of said stem and jam nuts 14 and 15 are mounted upon the stem upon opposite sides of the cross bar to securely hold the parts together. A band 11 surrounds the cylinder and is provided with lugs 10 which are apertured for the reception of the lower threaded ends of the guide rods 7, said rods being held in place by means of the jam nuts 10'. Said rods 7 pass through apertures in a crosspiece 9, fastened to the upper end of the cylinder, and buffer springs 16 are mounted upon the rods 7 intermediate the crosspiece 9 and said bar 8 and serve as shock absorbers when the wagon returns to its normal position after having been elevated for the purpose of dumping the contents of the box. Other springs, designated by numeral 17, are fastened to the crosspiece 9 and are mounted about the bars 7 and are designed to come in contact with the lugs 10 when the piston is forced upward by introduction of steam in the lower portion thereof and serve to prevent a sudden jar incident to the piston reaching its upper limit.

Bracket members 21 are fastened to the forward end of the box and have forwardly projecting arms 22 which are apertured for the reception of the bolts 19 which also pass through the arms 23 upon the bracket member 20 which is also fastened to the box, and nuts 25 are mounted upon the ends of the bolts 19. Links 18 are pivotally connected at corresponding ends upon the bolts 19 and their other ends are pivotally connected to the shank portions of the screws 15 which are mounted in the threaded holes in the lugs 10.

The operation of my invention will be readily understood and is as follows: When steam is introduced into the lower portion of the cylinder, the piston will be driven upward and, through the connections with the box, the latter will be tilted to the position shown in Fig. 1 of the drawings. Any shock incident to the piston reaching its upper limit will be avoided by the buffer springs 17, whereas, on the return movement of the piston to its lowest position incident to the lowering of the box to its normal horizontal position, the crosspiece 8 coming in contact with the springs 16 will tend to prevent jar to the box.

What I claim to be new is:—

1. A steam hoist for elevating boxes of dumping wagons of automobiles, etc., consisting of a truck and a pivotal box thereon, a steam cylinder, a piston mounted therein and a stem secured to the piston and movable through the end of the cylinder, a band movable about the piston, pivotal link connections between said band and box, and connections between the band and piston rod.

2. A steam hoist for elevating boxes of dumping wagons of automobiles, etc., consisting of a truck and a pivotal box thereon, a steam cylinder, a piston mounted therein and a stem secured to the piston and movable through the end of the cylinder, a band movable about the piston, pivotal link connections between said band and box, connections between the band and piston rod, and buffer means for preventing jar to the apparatus as the piston reaches its limit in opposite directions.

3. In combination with a truck having a box pivotally mounted thereon, a steam cylinder, a piston therein and a piston rod secured to the piston and movable through a suitably packed gland at the upper end thereof, a band surrounding the cylinder and provided with projecting portions, links pivotally connecting the box and band, and connections between the piston and band.

4. In combination with a truck having a box pivotally mounted thereon, a steam cylinder, a piston therein and a piston rod secured thereto and movable through a suitably packed gland at the upper end thereof, a band surrounding the cylinder and provided with projecting portions, links pivotally connecting the box and band, a cross bar connected to the piston rod, and rods connecting said bar and band.

5. In combination with a truck having a box pivotally mounted thereon, a steam cylinder, a piston therein and a piston rod secured thereto and movable through a suitably packed gland at the upper end thereof, a band surrounding the cylinder and provided with projecting portions, links pivotally connecting the box and band, a cross bar connected to the piston rod, rods connecting said bar and band, and a crosspiece upon the cylinder which is apertured for the reception of said rods.

6. In combination with a truck having a box pivotally mounted thereon, a steam cylinder, a piston therein and a piston rod secured to the piston and movable through a suitably packed gland at the upper end thereof, a band surrounding the cylinder and provided with projecting portions, links pivotally connecting the box and band, a cross bar connected to the piston rod, rods connecting said bar and band, a crosspiece upon the cylinder which is apertured for the reception of said rods, buffer springs upon the rod interposed between said bar and crosspiece upon the cylinder, and buffer springs upon the rods intermediate said crosspiece and band.

7. In combination with a truck having a box pivotally mounted thereon, a steam cylinder, a piston therein and a piston rod secured to the piston and movable through a suitably packed gland at the upper end thereof, a band about the cylinder and having oppositely disposed projections which are apertured, rods passing through said apertures and fastened therein, an apertured cross bar secured to the piston and to which said rods are secured, an apertured crosspiece upon the cylinder through which the rods are guided, buffer springs mounted upon the rods and interposed between said bar and crosspiece and between the latter and said projections upon the band, and pivotal link connections between said band and box.

8. In combination with a truck having a box pivotally mounted thereon, a steam cylinder, a piston therein and a piston rod secured to the piston and movable through a suitably packed gland at the upper end thereof, a band about the cylinder and having oppositely disposed projections which are apertured, rods passing through said apertures and fastened therein, an apertured cross bar secured to the piston and to which said rods are secured, an apertured crosspiece upon the cylinder through which the rods are guided, buffer springs mounted upon the rods and interposed between said bar and crosspiece and between the latter and said projections upon the band, bracket members secured to the box, links pivoted to said bracket members, and screws upon the projections of the band and to which said links are pivoted.

In testimony whereof I hereunto affix my signature in presence of two witnesses.

CHARLES B. BUCK.

Witnesses:
A. L. Hough,
A. R. Fowler.